(12) United States Patent
Takahashi

(10) Patent No.: US 10,494,026 B2
(45) Date of Patent: Dec. 3, 2019

(54) VEHICLE LOWER SECTION STRUCTURE

(71) Applicant: TOYOTA JIDOSHA KABUSHIKI KAISHA, Toyota-shi (JP)

(72) Inventor: Naoki Takahashi, Miyoshi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/950,307

(22) Filed: Apr. 11, 2018

(65) Prior Publication Data

US 2018/0312197 A1    Nov. 1, 2018

(30) Foreign Application Priority Data

Apr. 28, 2017 (JP) ................. 2017-090216

(51) Int. Cl.
*B62D 25/02* (2006.01)
*B62D 25/20* (2006.01)
(Continued)

(52) U.S. Cl.
CPC ............... *B62D 21/02* (2013.01); *B60K 1/04* (2013.01); *B62D 25/025* (2013.01); *B62D 25/2018* (2013.01); *B62D 25/2036* (2013.01); *B60K 2001/0438* (2013.01); *B60K 2001/0472* (2013.01); *B62D 21/157* (2013.01); *B62D 25/2027* (2013.01); *B62D 29/008* (2013.01)

(58) Field of Classification Search
CPC .... B62D 21/14; B62D 21/152; B62D 21/155; B62D 21/157; B62D 25/025; B62D 25/20; B62D 25/2027; B62D 25/2036; B60K 1/04; B60K 2001/0438; B60K 2001/0472

See application file for complete search history.

(56) References Cited

U.S. PATENT DOCUMENTS

2007/0205635 A1* 9/2007 Bunsmann ............. B62D 21/00
296/204
2010/0052368 A1* 3/2010 Yamaguchi .......... B62D 25/087
296/203.04

(Continued)

FOREIGN PATENT DOCUMENTS

JP    2006-273134    10/2006
JP    2014-91422     5/2014

(Continued)

*Primary Examiner* — Gregory A Blankenship
(74) *Attorney, Agent, or Firm* — Oblon, McClelland, Maier & Neustadt, L.L.P.

(57) ABSTRACT

There is provided a vehicle lower section structure including: a frame member that includes a pair of rockers, a front cross member coupled to the pair of rockers through a front coupling member, and a rear cross member coupled to the pair of rockers through a rear coupling member; an intermediate cross member that extends in the vehicle width direction between the front cross member and the rear cross member and that is coupled to the pair of rockers; and a bridging member that includes a rear portion located at a vehicle rear of the bridging member and joined to the rear cross member or the rear coupling member, and that includes a front portion located at a vehicle front of the bridging member and joined to one of the rockers, the front cross member, the front coupling member, or the intermediate cross member.

8 Claims, 6 Drawing Sheets

(51) Int. Cl.
    *B62D 21/02*     (2006.01)
    *B62D 21/15*     (2006.01)
    *B60K 1/04*     (2019.01)
    *B62D 29/00*     (2006.01)

(56) References Cited

U.S. PATENT DOCUMENTS

| | | | |
|---|---|---|---|
| 2013/0229030 A1* | 9/2013 | Yamaguchi | B60K 1/04 |
| | | | 296/193.07 |
| 2015/0008703 A1* | 1/2015 | Furusaki | B62D 21/152 |
| | | | 296/187.08 |
| 2015/0251700 A1* | 9/2015 | Choi | B62D 25/20 |
| | | | 296/204 |
| 2016/0083011 A1* | 3/2016 | Kawaguchi | B62D 21/02 |
| | | | 296/203.01 |
| 2016/0144897 A1* | 5/2016 | Cho | B62D 21/08 |
| | | | 296/204 |
| 2016/0207572 A1* | 7/2016 | Natsume | B62D 25/20 |
| 2016/0264177 A1* | 9/2016 | Kawaguchi | B62D 25/20 |
| 2017/0001507 A1* | 1/2017 | Ashraf | B60K 1/04 |
| 2017/0073019 A1* | 3/2017 | Kabayama | B62D 21/155 |
| 2017/0088189 A1 | 3/2017 | Saeki | |
| 2017/0101132 A1* | 4/2017 | Chung | B62D 21/02 |
| 2017/0113541 A1* | 4/2017 | Muramatsu | B60K 15/07 |
| 2017/0113542 A1* | 4/2017 | Muramatsu | B60K 15/067 |
| 2017/0129546 A1* | 5/2017 | Gong | B62D 23/005 |
| 2017/0182873 A1* | 6/2017 | Baccouche | B62D 25/087 |
| 2017/0197667 A1* | 7/2017 | Kabayama | B62D 21/08 |
| 2017/0217496 A1* | 8/2017 | Langhoff | B62D 21/155 |
| 2017/0259851 A1* | 9/2017 | Higuchi | B62D 21/15 |
| 2017/0297631 A1* | 10/2017 | Schneider | B62D 25/20 |
| 2018/0162448 A1 | 6/2018 | Takahashi | |
| 2018/0215418 A1* | 8/2018 | Hijikata | B62D 25/20 |
| 2018/0236863 A1* | 8/2018 | Kawabe | B62D 25/025 |
| 2018/0304937 A1* | 10/2018 | Kita | B62D 25/2036 |
| 2018/0312197 A1* | 11/2018 | Takahashi | B62D 21/02 |
| 2018/0346031 A1* | 12/2018 | Takahashi | B62D 21/11 |
| 2019/0023324 A1* | 1/2019 | Sekiya | B60K 1/04 |
| 2019/0031241 A1* | 1/2019 | Ayukawa | B62D 21/157 |
| 2019/0061830 A1* | 2/2019 | Fujisawa | B62D 25/08 |

FOREIGN PATENT DOCUMENTS

| | | |
|---|---|---|
| JP | 2016-107692 | 6/2016 |
| JP | 2017-65312 | 4/2017 |
| JP | 2018-95007 A | 6/2018 |

\* cited by examiner

VEHICLE LOWER SECTION STRUCTURE

CROSS-REFERENCE TO RELATED APPLICATION

This application is based on and claims priority under 35 USC 119 from Japanese Patent Application No. 2017-090216 filed on Apr. 28, 2017, the disclosure of which is incorporated by reference herein.

BACKGROUND

Technical Field

The present disclosure relates to a vehicle lower section structure.

Related Art

Japanese Patent Application Laid-Open (JP-A) No. 2006-273134 describes a structure in which a rear floor-side member extends substantially in a vehicle front-rear direction, and a cross member extends substantially in a vehicle width direction above the rear floor-side member. A frame couples the rear floor-side member and the cross member together substantially in the vehicle front-rear direction.

As a vehicle lower section structure, a pair of rockers extending in a vehicle front-rear direction and plural cross members extending in a vehicle width direction are coupled together by coupling members so as to form a frame-shaped frame member. A heavy load is able to be mounted at the inner side of the frame member.

However, in such frame-shaped frame members, when a rear side member is offset from the rockers and is joined to cross members or the like, the frame member is liable to deform under load from the rear side member.

Were, for example, the joint strength of the cross members and the coupling members to be raised in order to suppress deformation of the frame member, this would lead to an increase in weight.

SUMMARY

The present disclosure employs a lightweight structure to suppress deformation of a frame member in a vehicle lower section structure in which the frame member is formed in a frame-shape by a pair of rockers and plural cross members.

In a first aspect, a vehicle lower section structure includes a frame member, an intermediate cross member, and a bridging member. The frame member includes a pair of rockers disposed separated from one another in a vehicle width direction and extending in a vehicle front-rear direction, a front cross member coupled to the pair of rockers through a front coupling member at the vehicle front side, and a rear cross member coupled to the pair of rockers through a rear coupling member at the vehicle rear side. The frame member is formed in a frame shape by the pair of rockers, the front cross member, and the rear cross member. The intermediate cross member extends in the vehicle width direction between the front cross member and the rear cross member, and is coupled to the pair of rockers. The bridging member includes a rear portion located at the vehicle rear of the bridging member and joined to the rear cross member or the rear coupling member. The bridging member further includes a front portion located at the vehicle front of the bridging member and joined to one of the rockers, the front cross member, the front coupling member, or the intermediate cross member.

This vehicle lower section structure includes the bridging member. The rear portion of the bridging member is joined to the rear cross member or the rear coupling member. The front portion of the bridging member is joined to one of the rockers, the front cross member, the front coupling member, or the intermediate cross member. Namely, the bridging member bridges between the rear cross member or the rear coupling member and one of the rockers, the front cross member, the front coupling member, or the intermediate cross member. This thereby enables deformation of the frame member to be suppressed by the bridging member when a load attempting to deform the frame member acts. Moreover, there is no need to increase the joint strength between the rockers and the rear cross member or the rear coupling member in order to suppress deformation of the frame member, resulting in a lightweight structure.

A second aspect is the first aspect, wherein a rear side member is joined to the rear coupling member or the rear cross member. The rear side member extends toward the vehicle rear and is offset to a vehicle width direction inner side of one of the rockers.

The rear side member extends toward the vehicle rear and is offset to the vehicle width direction inner side of one of the rockers. Accordingly, when load through the rear side member acts on the rear coupling member or the rear cross member, this load acts in a manner to deform the frame member. However, since the vehicle lower section structure includes the bridging member, deformation of the frame member is able to be suppressed even when a load acts through the rear side member.

A third aspect is either the first aspect or the second aspect, further including a mounted member that is mounted to a frame lower section at a frame-inside of the frame member. Moreover, the rear coupling member is coupled to the rockers at a frame upper section at a frame-inside of the frame member.

The mounted member is mounted to the frame lower section, while the rear coupling member is coupled to the rockers at the frame upper section. Accordingly, the rear coupling member does not affect mounting of the mounted member. Moreover, since the vehicle lower section structure is provided with the bridging member, deformation of the frame member can be suppressed even in a structure in which the rear coupling member is coupled to the rockers at the frame upper section.

A fourth aspect is the third aspect, wherein a height of the frame upper section is shorter than a height of the frame lower section.

Since the height of the frame upper section is short, a large vehicle doorway opening height can be secured, even when the frame upper section is positioned at the vehicle doorway.

The present disclosure enables, in a vehicle lower section structure including a frame-shaped frame member formed by a pair of rockers and plural cross members, deformation of the frame member to be suppressed with a lightweight structure.

BRIEF DESCRIPTION OF THE DRAWINGS

Exemplary embodiments of the present disclosure will be described in detail based on the following figures, wherein.

DETAILED DESCRIPTION

Figure 1:
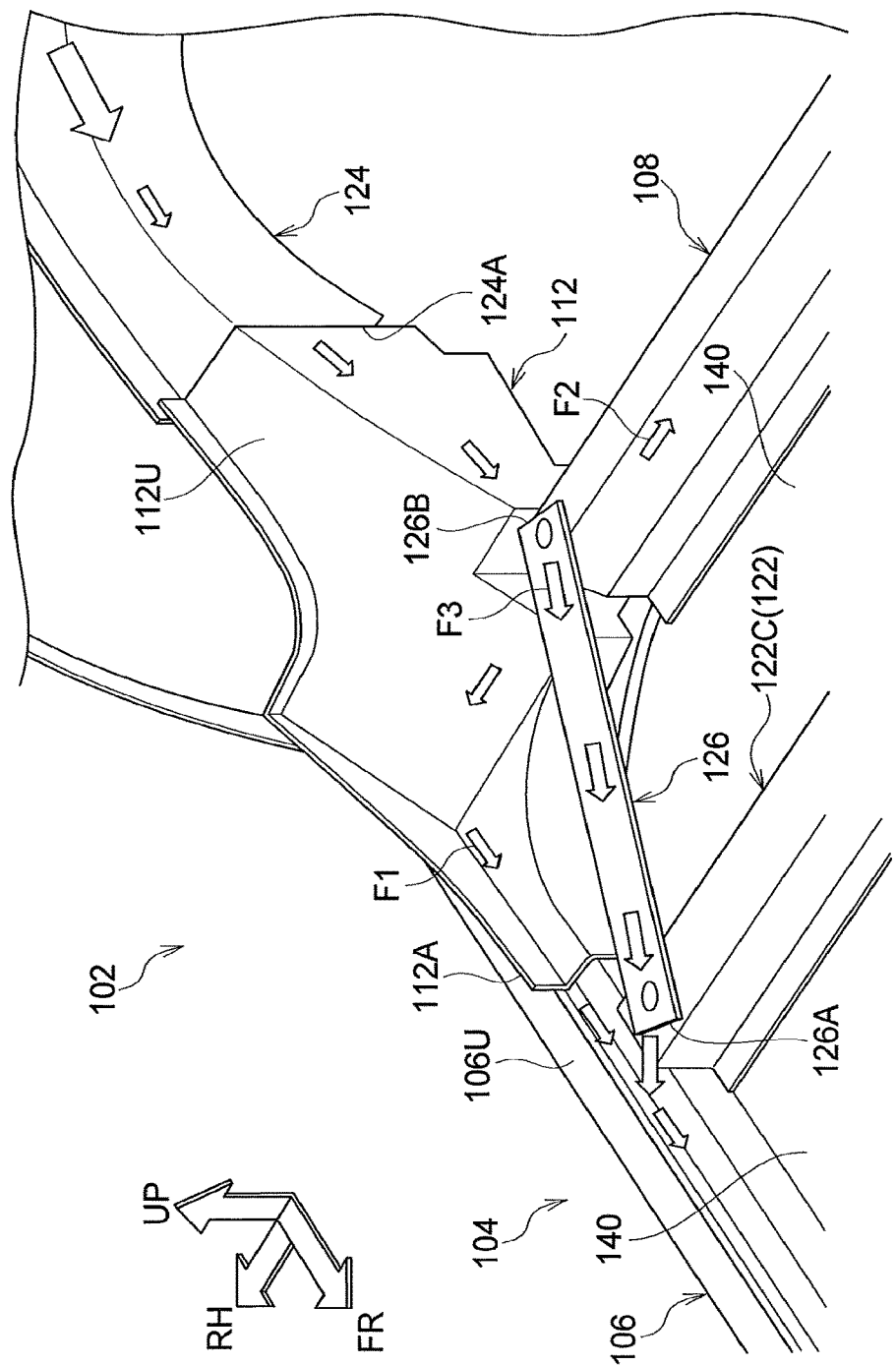
FIG. 1 is an enlarged perspective view illustrating part of a vehicle lower section structure of a first exemplary embodiment.

Explanation follows regarding a vehicle lower section structure 102 of an exemplary embodiment of the present disclosure, with reference to the drawings. In the drawings, the arrow FR, the arrow UP, and the arrow RH respectively indicate a vehicle forward direction, a vehicle upward direction, and a right side in a vehicle width direction.

Figure 2:
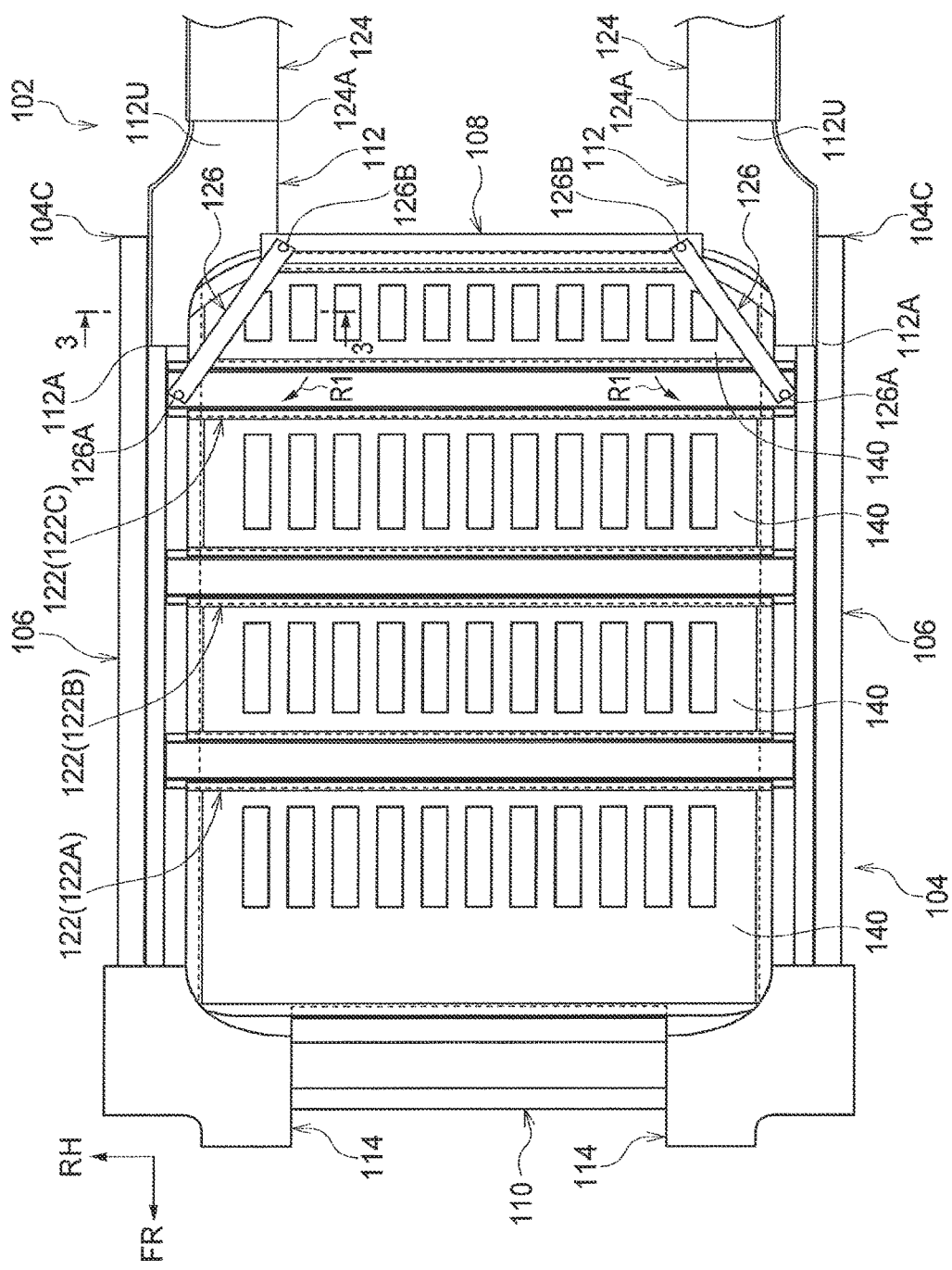
FIG. 2 is a plan view illustrating a vehicle lower section structure of the first exemplary embodiment.

As illustrated in FIG. 2, the vehicle lower section structure 102 includes a frame-shaped frame member 104. The frame member 104 is disposed between a front vehicle axle and a rear vehicle axle, and is a member configuring a lower section of the vehicle.

The frame member 104 includes a pair of rockers 106. The rockers 106 are separated from each other in the vehicle width direction and each extend in a vehicle front-rear direction. The frame member 104 also includes a rear cross member 108 and a front cross member 110 extending in the vehicle width direction at the vehicle rear and the vehicle front. The vehicle width direction ends of the rear cross member 108 are each coupled to a rear end of the respective rocker 106 by rear coupling members 112. The vehicle width direction ends of the front cross member 110 are each coupled to a front end of the respective rocker 106 by front coupling members 114. In this manner, the pair of rockers 106, the rear cross member 108, and the front cross member 110 are coupled together by the rear coupling members 112 and the front coupling members 114, thereby configuring the frame member 104 with a rectangular frame shape overall.

Figure 3:
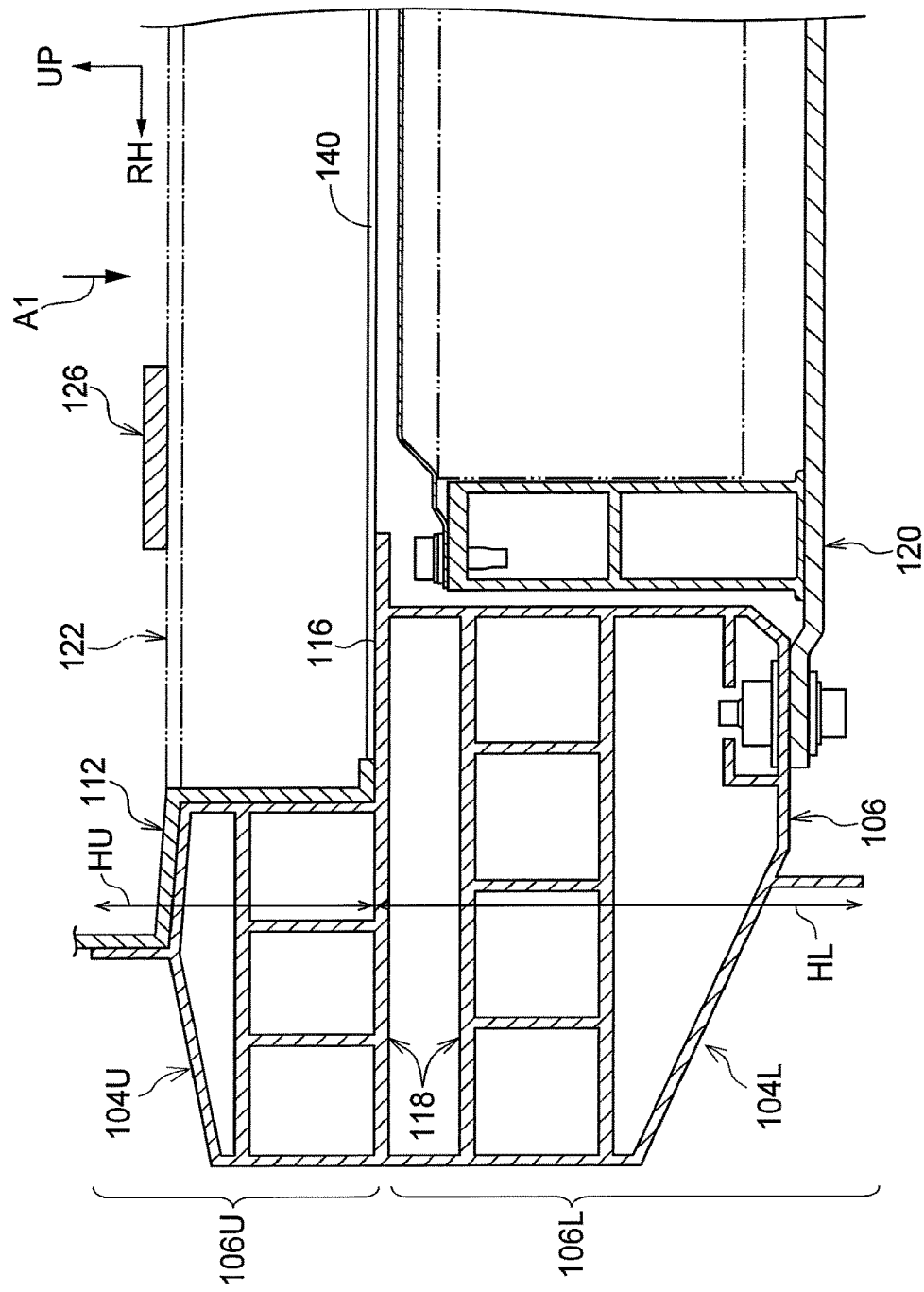
FIG. 3 is a cross-section illustrating a vehicle lower section structure of the first exemplary embodiment, taken along line 3-3 in FIG. 2.

As illustrated in FIG. 3, each of the rockers 106 has a hollow closed cross-section profile in vehicle width direction cross-section. Each rocker 106 is formed with a step 116 at a substantially intermediate position in the vertical direction. A rocker lower section 106L, this being a section below the step 116, juts out further toward the vehicle width direction inner side (toward the right in FIG. 3) than a rocker upper section 106U, this being a section above the step 116. Namely, an upper face of this jutting-out portion configures the step 116. Energy absorption members 118 are provided within each rocker 106, such that, for example, impact energy in a side collision of the vehicle is partially absorbed by deformation of the energy absorption members 118.

In plan view (as viewed along the arrow A1 direction), one or more battery packs 120 are mounted at the inner side of the frame member 104. Each battery pack 120 is, for example, cuboid in shape, and is mounted to the frame member 104 in an orientation in which a thickness direction of the battery pack 120 matches the vehicle vertical direction. Cover plates 140 are attached at the inner side of the frame member 104, and the cover plates 140 cover the battery packs 120 from above. In the present exemplary embodiment, the vehicle provided with the vehicle lower section structure 102 is a vehicle that runs by using electric power supplied from the battery pack 120 to drive a motor.

The battery pack 120 is an example of a mounted member. Regarding the vehicle, the present exemplary embodiment may also be applied to a vehicle driven using energy obtained by chemically reacting hydrogen stored in a hydrogen tank. In such cases, the hydrogen tank would be an example of a mounted member.

As illustrated in FIG. 3, in the present exemplary embodiment, a vertical position of the battery pack 120 corresponds to the position where the rocker lower section 106L is formed. The battery pack 120 does not project above the step 116.

In the present exemplary embodiment, in each rocker 106, the rocker lower section 106L (height HL) is taller than the rocker upper section 106U (height HU). Likewise, in the frame member 104, a height HU of a frame upper section 104U (a portion above the step 116) is shorter than a height HL of a frame lower section 104L (a portion below the step 116). Due to securing a sufficient height HL of the rocker lower section 106L, there are fewer constraints regarding the shape of the energy absorption member 118 mounted in the rocker lower section 106L. Moreover, due to securing a sufficient height HL of the rocker lower section 106L, a structure in which the battery pack 120 does not stick out above the step 116 can be achieved even when a tall battery pack 120 is mounted. Since the height HU of the rocker upper section 106U is shorter than the height HL of the rocker lower section 106L, the protrusion of the rocker upper section 106U toward the vehicle doorway is reduced, enabling a large vehicle doorway opening height to be secured, even, for example, in cases in which the rocker upper section 106U is positioned at the vehicle doorway.

One or more intermediate cross members 122 are disposed at positions above the step 116 and between the pair of rockers 106. Each intermediate cross member 122 extends in the vehicle width direction. In the example illustrated in FIG. 2, three of the intermediate cross members 122 are disposed spaced apart from one another in the vehicle front-rear direction.

The two length direction (vehicle width direction) end portions of each intermediate cross member 122 are joined to the respective rockers 106. In the present exemplary embodiment, three of the intermediate cross members 122 are disposed spaced apart from one another in the vehicle front-rear direction. In sequence from the vehicle front, the three intermediate cross members 122 in FIG. 2 are identified as the intermediate cross members 122A, 122B, 122C.

As illustrated in FIG. 1, the join locations between the rear coupling members 112 and the rockers 106 are positioned at the rocker upper section 106U. Accordingly, the rear coupling members 112 do not affect the rocker lower section 106L, namely an installation space of the battery pack 120.

Each rear coupling member 112 includes a coupling member upper section 112U that is positioned higher than the rocker 106. As can be seen in FIG. 1, the coupling member upper section 112U is a location that is offset in the vehicle upward direction and to the vehicle width direction inner side with respect to the rocker 106.

Each of the rear coupling members 112 is joined to a rear side member 124. In the present exemplary embodiment, a joining position 124A of the rear side member 124 to the rear coupling member 112 is offset further toward the vehicle width direction inner side and the vehicle upper side than a rear corner 104C of the frame member 104 (a point where a portion extended rearward from the rocker 106 and a portion extended in the vehicle width direction from the rear side member 124 intersect). The rear side member 124 is thus offset to the vehicle upper side and vehicle width direction inner side with respect to the rocker 106. The rear side member 124 extends from the joining position 124A toward the vehicle rear.

A bridging member 126 bridges between rear cross member 108 and the intermediate cross member 122C that is furthest toward the vehicle rear out of the plural intermediate cross members 122. A front portion 126A of the bridging member 126 is joined to the intermediate cross member 122C in the vicinity of the rocker 106, and a rear portion 126B of the bridging member 126 is joined to the rear cross member 108 in the vicinity of the rear coupling member 112. The rear portion 126B of the bridging member 126 is thus positioned offset further toward the vehicle width direction inner side than the rear corner 104C.

Next, explanation follows regarding operation of the present exemplary embodiment.

As illustrated in FIG. 1, in the vehicle lower section structure 102 of the present exemplary embodiment, the bridging member 126 bridges between the intermediate cross member 122C and the rear cross member 108. The rear portion 126B of the bridging member 126 is joined to the rear cross member 108, and the front portion 126A of the bridging member 126 is joined to the intermediate cross member 122. Load transmission routes for load acting on the rear cross member 108 from the vehicle rear include a route F1 from the rear coupling member 112 to the rocker 106, and a route F2 from the rear coupling member 112 to the rear cross member 108. More, in the present disclosure, in addition to the two routes described above, providing the bridging member 126 also establishes a route F3 from the rear coupling member 112 to the rocker 106 through the bridging member 126. In this manner, since part of a load from the rear will act on the bridging member 126, buckling of a joint 112A can be more effectively suppressed than in a structure not provided with the bridging member 126.

In particular, the rear side member 124 is joined to the rear cross member 108 at the joining position 124A that is offset further toward the vehicle width direction inner side than the rocker 106. Accordingly, when, for example, load toward the vehicle front acts through the rear side member 124 in a rear collision, the rear cross member 108 and the rear coupling member 112 attempt to rotate in an arrow R1 direction about the joint 112A. However, when this occurs, since the present exemplary embodiment is provided with the bridging member 126, the rear cross member 108 and the rear coupling member 112 can be suppressed from rotating in the arrow R1 direction. Suppressing rotation of the rear cross member 108 and the rear coupling member 112 enables deformation of the frame member 104 to be suppressed. Note that the force attempting to rotate the rear cross member 108 and the rear coupling member 112 in the arrow R1 direction is not limited to load acting through the rear side member 124.

Moreover, there is no need to increase the joint strength between the rocker 106 and the rear coupling member 112 at the joining position 112A, nor to increase the height or plate thickness of the rocker 106, in order to suppress such rotation. This enables an increase in the weight of the frame member 104 to be suppressed.

Moreover, the present exemplary embodiment, the structure of the rocker 106 is configured such that the joint 112A of the rear coupling member 112 is provided at the rocker upper section 106U that has a shorter height than the rocker lower section 106L, and therefore does not affect mounting of the battery pack 120. Moreover, even for structures in which a sufficient height of the joint 112A cannot be secured, rotation of the rear cross member 108 and the rear coupling member 112 is still suppressed due to providing the bridging member 126.

Note that the join location of the front portion 126A of the bridging member 126 is not limited to an intermediate cross member 122, and similarly, the join location of the rear portion 126B of the bridging member 126 is not limited to the rear cross member 108. Namely, the structures of the following exemplary embodiments may be adopted.

Figure 4:
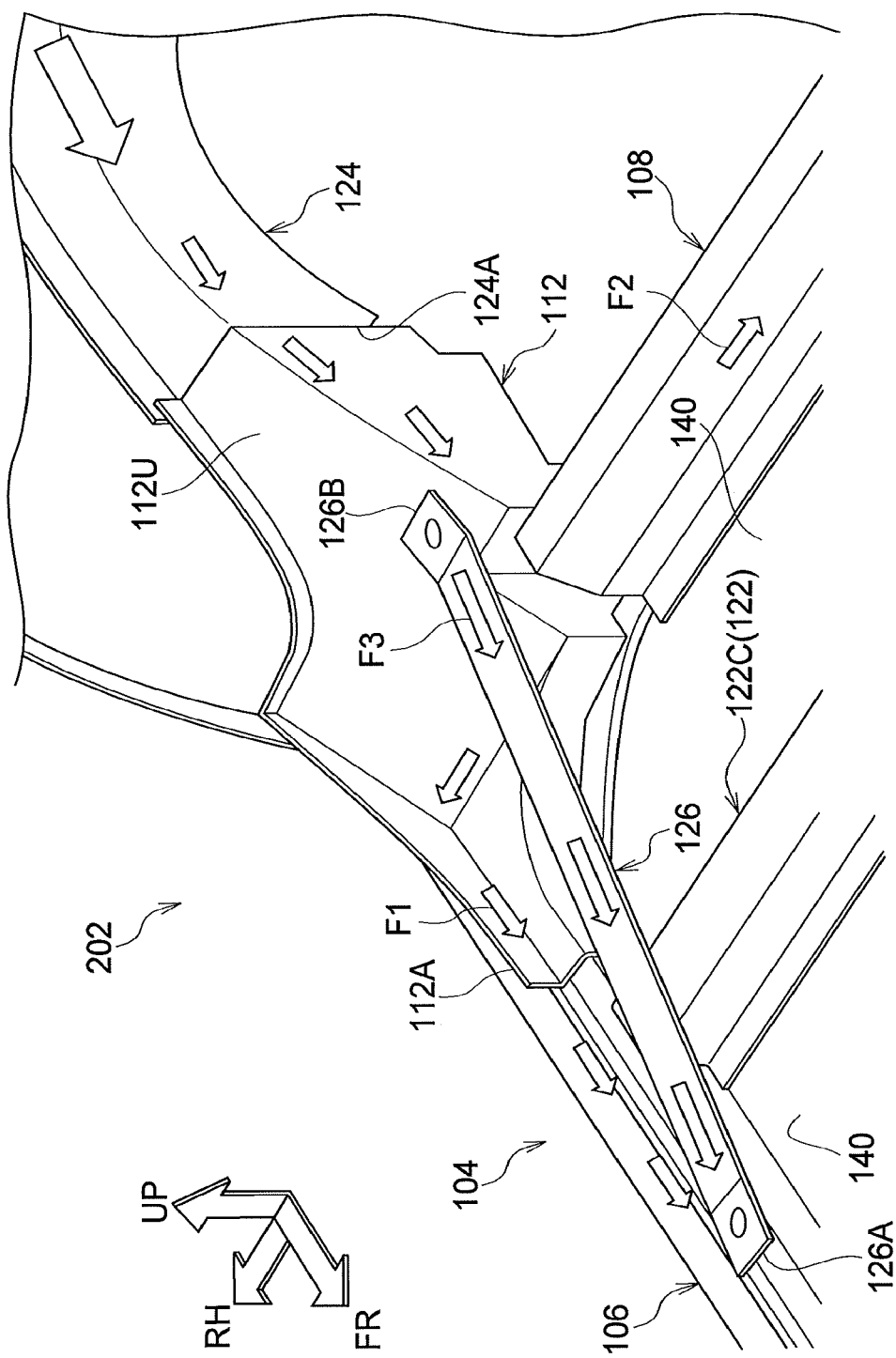
FIG. 4 is an enlarged perspective view illustrating part of a vehicle lower section structure of a second exemplary embodiment.

In a vehicle lower section structure 202 of a second exemplary embodiment, illustrated in FIG. 4, the front portion 126A of the bridging member 126 is joined to the rocker 106, and the rear portion 126B of the bridging member 126 is joined to the coupling member upper section 112U of the rear coupling member 112. Accordingly, the angle formed by the bridging member 126 with respect to the rocker 106 is smaller than in the first exemplary embodiment, and the bridging member 126 is closer to being parallel with the rocker 106. This thereby enables rotation of the rear cross member 108 and the rear coupling member 112 to be effectively suppressed.

Figure 5:
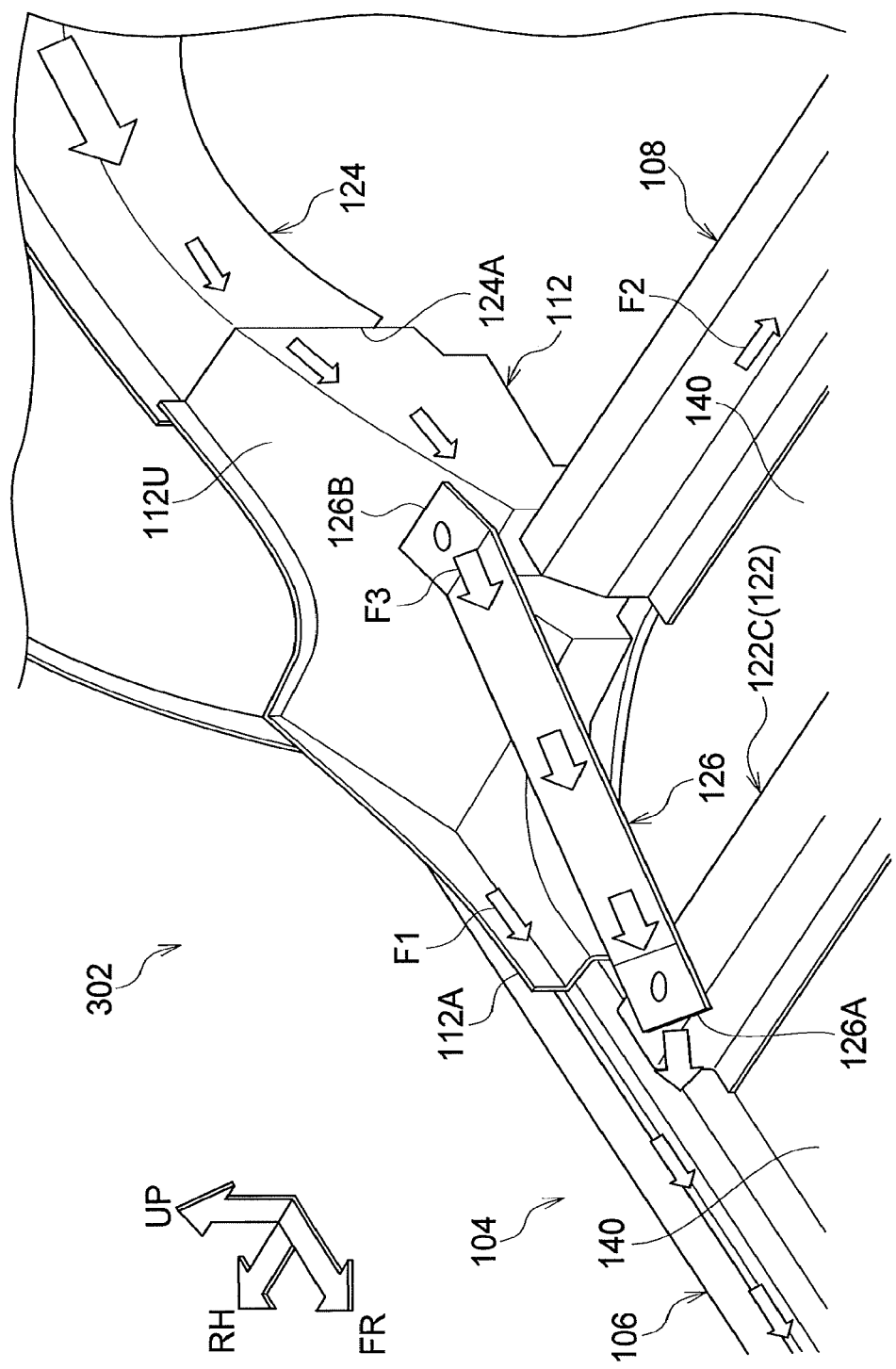
FIG. 5 is an enlarged perspective view illustrating part of a vehicle lower section structure of a third exemplary embodiment.

In a vehicle lower section structure 302 of a third exemplary embodiment, illustrated in FIG. 5, the front portion 126A of the bridging member 126 is joined to the intermediate cross member 122C, and the rear portion 126B of the bridging member 126 is joined to the coupling member upper section 112U of the rear coupling member 112.

Figure 6:
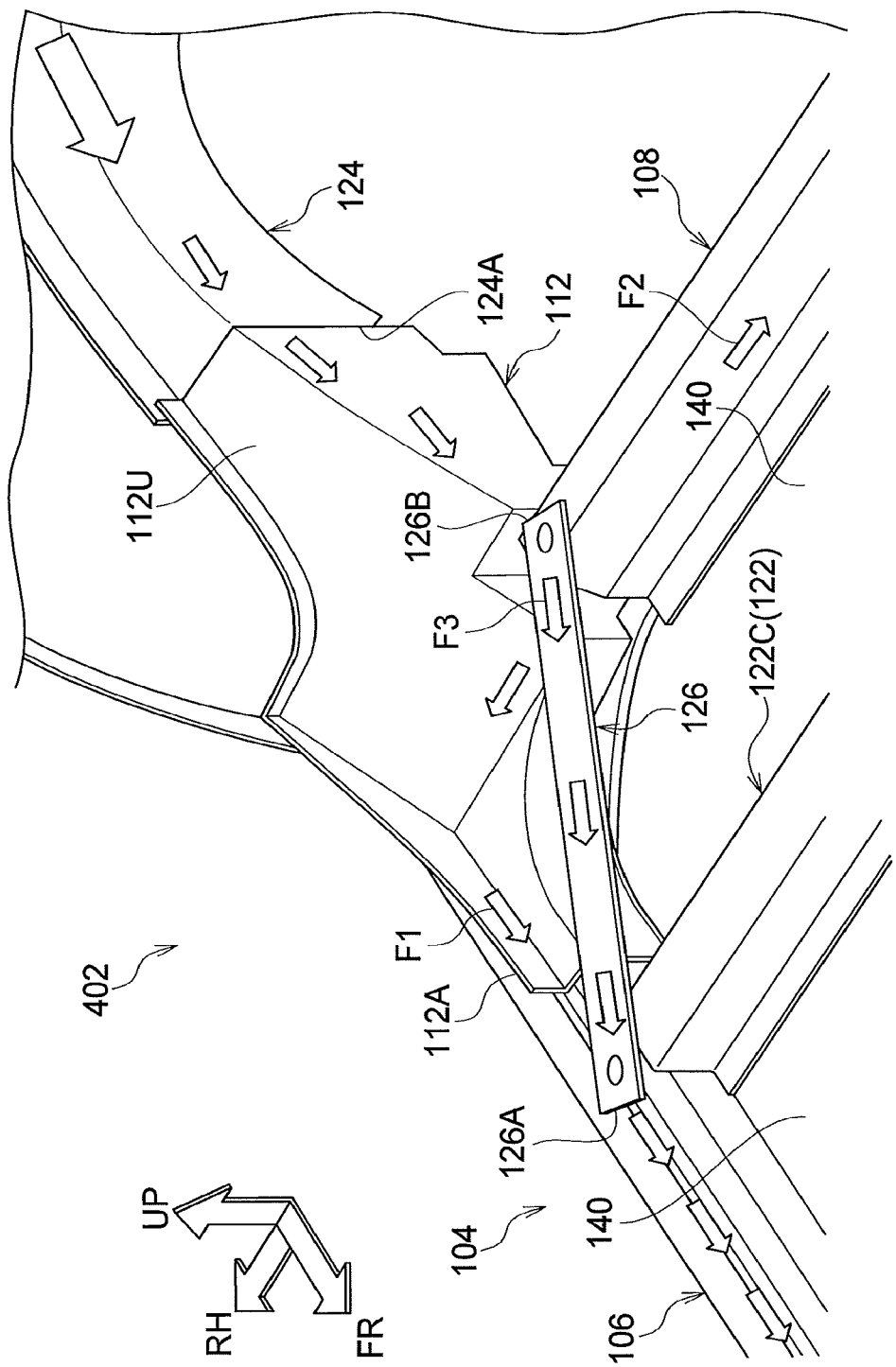
FIG. 6 is an enlarged perspective view illustrating part of a vehicle lower section structure of a fourth exemplary embodiment.

In a vehicle lower section structure 402 of a fourth exemplary embodiment, illustrated in FIG. 6, the front portion 126A of the bridging member 126 is joined to the rocker 106, and the rear portion 126B of the bridging member 126 is joined to the rear cross member 108.

Besides the configurations described in the first to the fourth exemplary embodiments described above, the front portion 126A of the bridging member 126 may, for example, be joined to the front cross member 110, the intermediate cross member 122A, or the intermediate cross member 122B.

In the structures of the first exemplary embodiment to the fourth exemplary embodiment described above, the bridging member 126 is at a position close to the rear corner 104C in plan view of the frame member 104. This enables the bridging member 126 to configure a structure that is contained below a rear seat, for example.

The bridging member 126 of the present disclosure may also be applied so as to suppress deformation of the frame member 104 at the front coupling members 114. Namely, a structure may be adopted in which a front portion of the bridging member 126 is joined to the front cross member 110 or the front coupling member 114, and a rear portion of the bridging member 126 is joined to the rocker 106, the rear cross member 108, or the intermediate cross member 122. Such a structure is capable of suppressing deformation at a joint between the front coupling member 114 and the rocker 106 when load from the vehicle front acts on the frame member 104. Moreover, there is no need to increase the joint strength of the joint between the front coupling member 114 and the rocker 106 in order to suppress deformation, thus enabling a lightweight structure to be achieved.

What is claimed is:

1. A vehicle lower section structure comprising:
a frame member that includes a pair of rockers separated from one another in a vehicle width direction and extending in a vehicle front-rear direction, a front cross member coupled to the pair of rockers through a front coupling member at a vehicle front side, and a rear cross member coupled to the pair of rockers through a rear coupling member at a vehicle rear side, the frame member being formed in a frame shape by the pair of rockers, the front cross member, and the rear cross member;

an intermediate cross member that extends in the vehicle width direction between the front cross member and the rear cross member and that is coupled to the pair of rockers; and a bridging member that includes a rear portion located at a vehicle rear of the bridging member and joined to one end, in the vehicle width direction, of the rear cross member or the rear coupling member, and that includes a front portion located at a vehicle front of the bridging member and joined to one of the rockers, the front cross member, the front coupling member, or the intermediate cross member.

2. The vehicle lower section structure of claim 1, further comprising a rear side member that is joined to the rear coupling member or the rear cross member, and that extends toward the vehicle rear offset at a vehicle width direction inner side of one of the rockers.

3. The vehicle lower section structure of claim 1, further comprising a mounted member that is mounted to a frame lower section at a frame-inside of the frame member, wherein the rear coupling member is coupled to the rockers at a frame upper section at a frame-inside of the frame member.

4. The vehicle lower section structure of claim 3, wherein a height of the frame upper section is shorter than a height of the frame lower section.

5. The vehicle lower section structure of claim 1, wherein the rear portion of the bridging member is joined to the rear cross member, and the front portion of the bridging member is joined to the intermediate cross member.

6. The vehicle lower section structure of claim 1, wherein the rear portion of the bridging member is joined to the rear coupling member, and the front portion of the bridging member is joined to one of the rockers.

7. The vehicle lower section structure of claim 1, wherein the rear portion of the bridging member is joined to the rear coupling member, and the front portion of the bridging member is joined to the intermediate cross member.

8. The vehicle lower section structure of claim 1, wherein the rear portion of the bridging member is joined to the rear cross member, and the front portion of the bridging member is joined to one of the rockers.

* * * * *